US012572772B2

(12) United States Patent
Lee et al.

(10) Patent No.: US 12,572,772 B2
(45) Date of Patent: Mar. 10, 2026

(54) SCALABLE DIGITAL TWIN SERVICE SYSTEM AND METHOD

(71) Applicant: ELECTRONICS AND TELECOMMUNICATIONS RESEARCH INSTITUTE, Daejeon (KR)

(72) Inventors: Mi Suk Lee, Daejeon (KR); Woo-Sug Jung, Daejeon (KR); Ji Eun Kim, Daejeon (KR); Hyunjin Kim, Daejeon (KR); Ki-Sook Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 776 days.

(21) Appl. No.: 17/981,632

(22) Filed: Nov. 7, 2022

(65) Prior Publication Data

US 2024/0152724 A1    May 9, 2024

(30) Foreign Application Priority Data

Nov. 16, 2021    (KR) ........................ 10-2021-0157955

(51) Int. Cl.
*G06N 3/006* (2023.01)
*G06F 3/04815* (2022.01)
(Continued)

(52) U.S. Cl.
CPC ......... *G06N 3/006* (2013.01); *G06F 3/04815* (2013.01); *G06F 30/20* (2020.01);
(Continued)

(58) Field of Classification Search
CPC ........ G06N 5/022; G06N 3/006; G06V 30/10; G06V 20/20; G10L 13/00; G10L 15/26;
(Continued)

(56) References Cited

U.S. PATENT DOCUMENTS 10,741,078 B2    8/2020    Kim et al.
10,778,774 B2    9/2020    Kim et al.

FOREIGN PATENT DOCUMENTS

KR    10-1774871 B1    9/2017
KR    10-1989982 B1    6/2019
(Continued)

OTHER PUBLICATIONS

Pan et al. NPL ("Digital Twin and Its Application in Power System" published 2020 by MPDI—Total 33 Pages (Year: 2020).*
(Continued)

*Primary Examiner* — Quoc A Tran
(74) *Attorney, Agent, or Firm* — LRK PATENT LAW FIRM

(57)    ABSTRACT

The present invention provides a scalable digital twin system structure and a scalable digital twin service method that are capable of, based on a digital twin, performing real-time control of the real world while providing information required for the user to determine the optimal countermeasure in solve real-world problems in stages, thereby helping rapidly solve problems of the real-world. In order to preemptively respond to the real-world problems by providing decision support information with improved reliability according to a timeline based on a digital twin of a scalable structure, the operation of the digital twin is divided into several stages according to complexity and a result of each stage is transferred to an application service and the next stage, so that as the stage becomes higher, a more reliable result can be provided.

19 Claims, 5 Drawing Sheets

(51) Int. Cl.

| | |
|---|---|
| *G06F 30/20* | (2020.01) |
| *G06F 111/18* | (2020.01) |
| *G06Q 50/10* | (2012.01) |
| *G06T 17/00* | (2006.01) |
| *G06T 19/00* | (2011.01) |
| *G06V 20/20* | (2022.01) |
| *H04L 67/131* | (2022.01) |

(52) U.S. Cl.

CPC .......... *G06F 2111/18* (2020.01); *G06Q 50/10* (2013.01); *G06T 17/00* (2013.01); *G06T 19/00* (2013.01); *G06T 19/006* (2013.01); *G06V 20/20* (2022.01); *H04L 67/131* (2022.05)

(58) Field of Classification Search

CPC ...... G06F 40/56; G06F 40/30; G06F 16/3329; G06F 16/3344; G06F 3/04815; G06F 30/20; G06F 2111/18; G06L 15/1822; G06Q 50/10; H04L 67/131; G06T 19/00; G06T 17/00; G06T 19/006

See application file for complete search history.

(56) References Cited

FOREIGN PATENT DOCUMENTS

| | | |
|---|---|---|
| KR | 10-1960162 B1 | 7/2019 |
| KR | 2021-0009151 A | 1/2021 |
| KR | 10-2326521 B1 | 11/2021 |

OTHER PUBLICATIONS

West et al. NPL ("Digital Twin Providing New Opportunities for Value Co-Creation through Supporting Decision-Making" published 2021 by IEEE—Total 6 Pages (Year: 2021).*

* cited by examiner

| MANAGEMENT DATA |
| --- |
| SPATIAL DATA |
| SENSOR DATA |

| DYNAMIC DATA |
| --- |
| MANAGEMENT DATA |
| SPATIAL DATA |
| SENSOR DATA |

| SIMULATION DATA |
| --- |
| DYNAMIC DATA |
| MANAGEMENT DATA |
| SPATIAL DATA |
| SENSOR DATA |

SCALABLE DIGITAL TWIN SERVICE SYSTEM AND METHOD

CROSS-REFERENCE TO RELATED APPLICATION

This application claims priority to and the benefit of Korean Patent Application No. 10-2021-0157955, filed on Nov. 16, 2021, the disclosure of which is incorporated herein by reference in its entirety.

BACKGROUND

1. Field of the Invention

The present invention relates to virtual reality, specifically, to a digital twin service.

2. Description of Related Art

A "digital twin" is a technology, which is performed in a virtual world, i.e., a replica of the real world (objects, spaces, processes, etc.), that analyzes various pieces of data collected from the real world, derives an optimization plan, and optimizes the real world based on the plan to support testing, controlling (including monitoring, etc.), simulation, and various types of decision-making. In recent years, with the development of element technologies, such as big data analysis, modeling and simulation, networks, etc., which is the basis of digital twin, digital twin is spotlighted as a technology that may solve various industrial and social problems in addition to problems in the manufacturing industry, the site to which digital twin technology is first applied.

Accordingly, Gartner Inc., an American information technology research and advisory company that presents 10 strategic technology trends every year, announced digital twin as one of the top 10 technologies in 2017, 2018 and 2019. In 2020, super-automation technology encompassing the concept of digital twin was included in the top 10 technologies. In addition, in 2016, Gartner Inc. announced three stages of digital twin technology development as shown in the table below.

| Stages | | Contents |
| --- | --- | --- |
| 1 | Real-world replication | Construction of 3D virtual world |
| 2 | Real-world supervision | Real-time monitoring |
| 3 | Real-world optimization | Analysis, Prediction, Optimization, Training |

Referring to the above table, in the first stage, the real world is visualized and constructed as a three-dimensional (3D) virtual world, and in the second stage, objects or systems in the real world are matched with those in the virtual world in one-to-one correspondence through the digital twin system, and data acquired from sensors installed in the real world is monitored or controlled. In the third stage, based on prediction, analysis, and simulation, it is possible to even control real objects for optimization of the real world.

The visualization and monitoring of data acquired in the real world in the virtual world using digital twins is applied in many fields, but the analysis, prediction, and simulation using digital twins require many networks and computing resources and thus are not actively applied in fields in which problem solving is imminent.

In South Korea, services corresponding to the "second stage, real-world supervision" for monitoring national infrastructure and social overhead capital (SoC) are mainly provided. For example, GS Caltex Corp. is building a digital twin-based integrated control center that enables real-time controlling of production facilities, and LG Uplus Corp. introduced a tractor remote diagnosis service using digital twin technology.

Advanced countries, such as the United States, United Kingdom, etc., are attempting to apply digital twin technology to various fields, such as cities, medical care, energy, and the like, by establishing policies to promote digital twin technology. In addition, companies, such as GE Co., MS Co., and Siemens AG are releasing digital twin systems, Predix, Azure, and Mindsphere, for historical data analysis, production process optimization. or the like.

Recently, with the development of big data analysis and artificial intelligence (AI) technology, and the evolution of network and computing power, various services using digital twin are being tried. In particular, by using digital twins, various experiments that are difficult to perform in the real world can be represented in the virtual world, and thus the digital twin may be widely used in areas, in which direct experiments are difficult, such as disaster related areas.

However, in order to utilize technologies that require high computing power, such as big data analysis along with real-time situation controlling and artificial intelligence, there is a need to improve the structure of the digital twin system.

SUMMARY OF THE INVENTION

As described above, the digital twin may be applied to all fields in which various problems of the real world need to be solved (optimization, response, etc.). In particular, in the field of disaster safety, damage by a disaster may be prevented from spreading by rapidly identifying the situation, and taking appropriate preparations or responses before an event (e.g., a disaster, or a sign that appears before a disaster) spreads. Therefore, the digital twin system for disaster safety management needs to present various types of information about the site in real time for situation controlling. In addition, when an event occurs, reliable decision support information needs to be rapidly provided so that the relevant person (or a user) may make the optimal decision.

However, in order to derive reliable decision support information, there is a need for data collected in the site to be analyzed from various angles, which takes a long processing time. In particular, the greater the amount of data and the more complex the space of the site, the longer it takes to derive decision support information, which may lead to a missed preemptive response time. That is, in order to reduce the spread of an event, a rapid response is required, but the response may be delayed due to the processing time required to derive reliable decision support information.

Accordingly, the present invention proposes a scalable digital twin system structure to address the above described limitation.

The present invention provides a scalable digital twin system structure and a scalable digital twin service method that are capable of, based on a digital twin, performing real-time control of the real world while providing information required for the user to determine the optimal countermeasure in solve real-world problems by stages, thereby helping rapidly solve problems of the real-world.

In order to preemptively respond to the real-world problems by providing decision support information with improved reliability according to a timeline based on a digital twin of a scalable structure, the operation of the digital twin is divided into several stages according to complexity and a result of each stage is transferred to an application service and the next stage, so that as the stage becomes higher, a more reliable result can be provided.

In brief, the present invention performs data analysis divided in stages according to complexity, from a simple threshold comparison analysis of data collected from the site to a causality analysis considering the spread of an event, and derives stepwise decision support information based on the analysis results of each stage and transfers the information to the relevant person (or a user). In addition, the derived stepwise decision support information is generated as a digital twin model for each stage so that the digital twin model is managed and utilized.

That is, the system for scalable digital twin according to the present invention is not implemented to derive decision support information after the final data analysis is finished but is implemented to analyze data in stages divided according to complexity, and based on the analyzed data, derive and provide stepwise decision support information for a rapid preemptive response. Therefore, the relevant person may make a decision in stages by using the decision support information provided in stages, so that the immediate situation can be responded to.

The configuration and operation of the present invention introduced above will become apparent through embodiments described below in conjunction with the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a schematic configuration diagram illustrating a scalable digital twin system proposed by the present invention;

FIGS. 2A and 2B are detailed block diagrams illustrating each part shown in FIG. 1;

DETAILED DESCRIPTION OF EXEMPLARY EMBODIMENTS

Figures 3, 4, 5, 6:
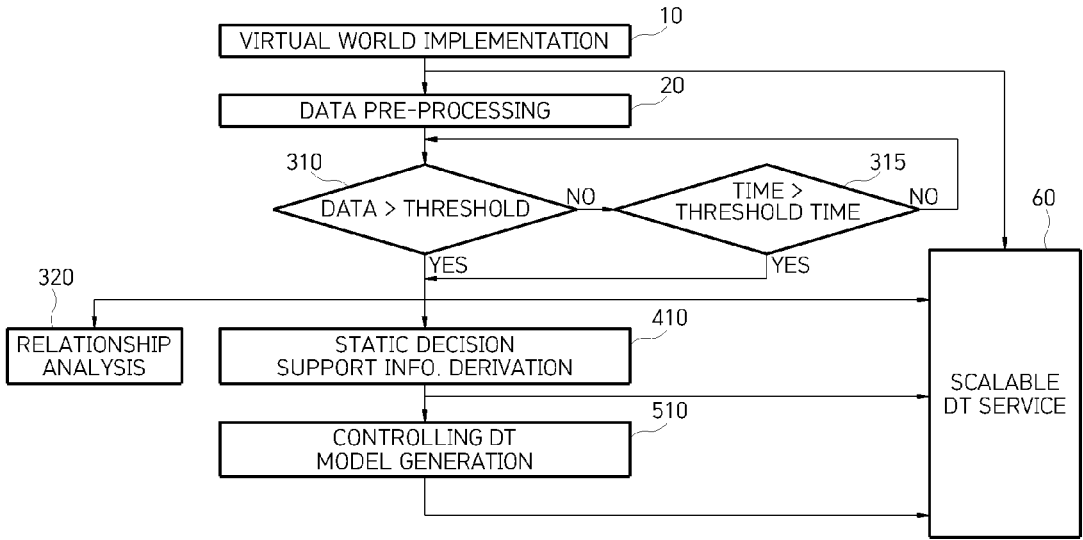
FIG. 3 is a flow chart showing threshold comparison analysis operations of a threshold comparison module (310)
FIG. 4 is a data structure diagram illustrating a controlling digital twin model.
FIG. 5 is a data structure diagram illustrating a relation-based digital twin model.
FIG. 6 is a data structure diagram illustrating a simulation-based digital twin model.

Hereinafter, the advantages and features of the present invention and ways of achieving them will become readily apparent with reference to the following embodiments described in detail in conjunction with the accompanying drawings. However, the present invention is not limited to such embodiments and may be embodied in various forms. The embodiments to be described below are provided only to make the disclosure of the present invention complete and assist those of ordinary skill in the art in fully understanding the scope of the present invention, and the scope of the present invention is defined only by the appended claims. Terms used herein are used for describing the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Figure 1:
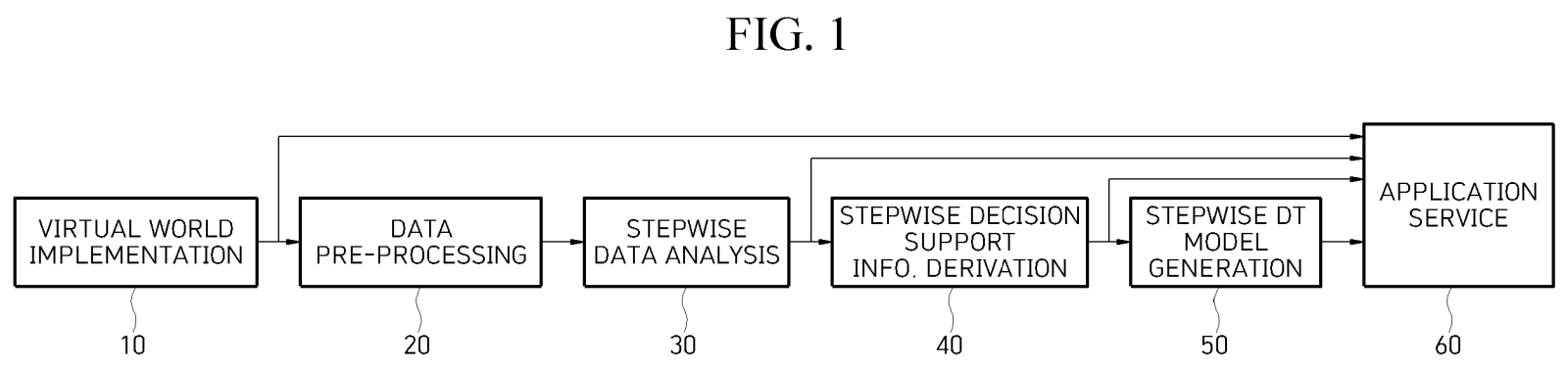
Figure 2A:
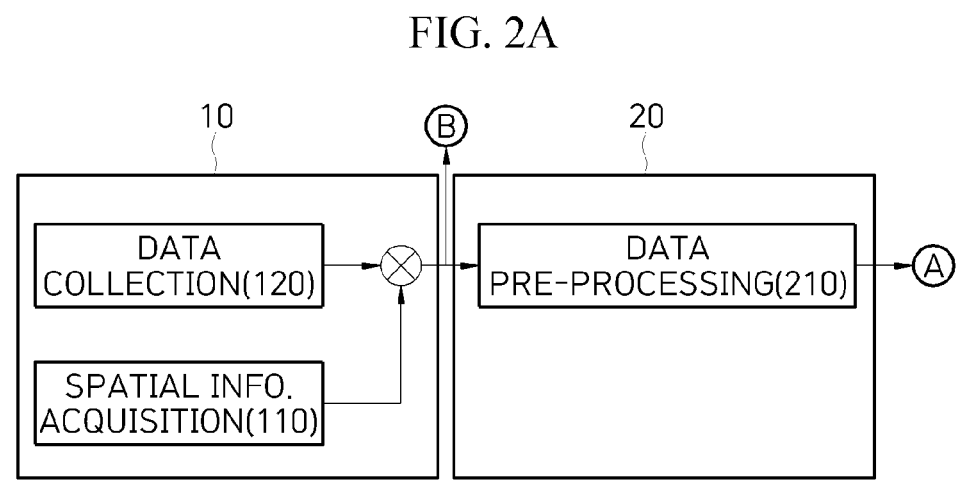

FIGS. 1 and 2A/2B illustrate a configuration and operation flow of a scalable digital twin system proposed by the present invention.

The scalable digital twin system according to the present invention is usable in various fields, and the following description will be made in relation to an example of use in the field of disaster safety. In the following description, an "event" is defined as an unusual phenomenon, such as a disaster, or a sign, etc. that appears before a disaster, and "on-site information", "on-site data", "sensor data", or "data" refers to data related to a disaster that is collected through sensors installed in the real world.

As presented above, in order to derive reliable decision support information, data collected in the site needs to be analyzed from various angles, which takes a great amount of processing time. In particular, the greater the amount of data and the more complex the space of the site, the longer it takes to derive decision support information, which may lead to a missed preemptive response time.

In order to address such a limitation, the present invention proposes a scalable digital twin system structure as shown in FIG. 1. Operations of the scalable digital twin system according to the present invention from virtual world implementation to application service will be described in brief with reference to FIG. 1.

First, a virtual world implementation unit 10 integrates spatial information and sensor data acquired from the real world to implement a virtual world, and transmits the virtual world to an application service 60 and a data pre-processing unit 20. The data pre-processed by the data pre-processing unit 20 is analyzed in stages (described below) by a stepwise data analysis unit 30, and a result of the analysis is transferred to the application service 60 and a stepwise decision support information derivation unit 40. The stepwise decision support information derivation unit 40 derives decision support information in stages, and transfers the derived decision support information to the application service 60 such that the relevant person is provided with the decision support information (in the drawings, INFO) to make a decision, while transferring the stepwise decision support information to a stepwise digital twin model generation unit 50 such that a digital twin (in the drawings, DT) model is generated with the stepwise decision support information. Here, the digital twin model generated by the stepwise digital twin model generation unit 50 may be considered a structured mass of data that provides a basis of the decision support information derived from the previous stage.

Figure 2B:
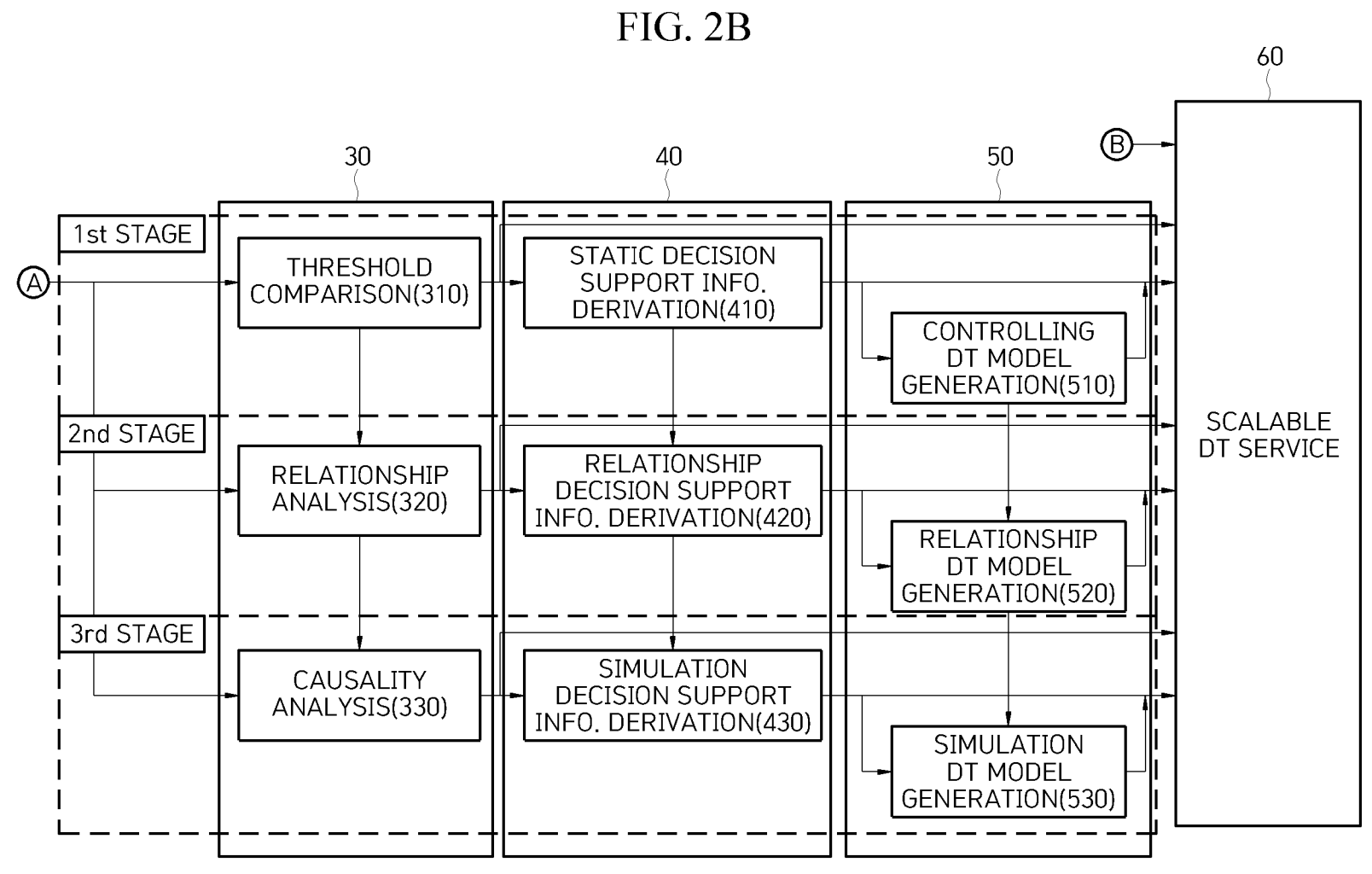

FIG. 2 that is separately depicted by FIG. 2A and FIG. 2B is a detailed block diagram illustrating each part shown in FIG. 1.

First, the virtual world implementation unit 10 includes a module 110 for acquiring spatial information in the real world, and a data collection module 120. The spatial information may be three-dimensional (3D) spatial information built in advance through light detection and ranging (Li- DAR) or the like. In addition, the spatial information may be obtained based on 3D spatial information built in advance and updated by detecting deformation of the space that may occur over time. In addition, when the system is implemented in practice, spatial information may be stored in the application service, i.e., a scalable digital twin system 60, in which an update may be performed after separately receiving only spatial information to be updated. In this case, the application service 60 needs to integrate and present the spatial information and on-site data, and transfer the spatial information even to a causality analysis module (to be described below).

The data pre-processing unit 20 may include a data pre-processing module 210 for compensating for missing values due to a network failure or a hardware defect of a sensor that may occur during transmission of the on-site data collected by the data collection module 120. The data pre-processing module 210 may also perform time synchronization between data to overcome a difference in data acquisition periods, and a difference in transmission delay or the like that may occur during data transmission.

Here, in the real world, an underground utility cavity or tunnel in which a plurality of various sensors are installed may be assumed. In this case, the spatial information is 2D or 3D spatial information about the underground utility cavity or tunnel, and the on-site data is data collected from various sensors, such as a temperature sensor, a humidity sensor, a carbon dioxide ($CO_2$) sensor, etc. installed in the underground cavity or tunnel.

In the next stage, the stepwise data analysis unit 30, the stepwise decision support information derivation unit 40, and the stepwise digital twin model generation unit 50 each perform functions in three stages. The core of the first stage is to perform real-time controlling (including monitoring), the core of the second stage is to perform analysis on a relationship of sensor data, and the core of the third stage is to perform a causality analysis (data analysis for simulation (including modeling) on the spread of an event. Each stage may refer to the result of the previous stage.

Each of the data analysis, decision support information derivation, and digital twin model generation performed in stages by the stepwise data analysis unit 30, the stepwise decision support information derivation unit 40, and the stepwise digital twin model generation unit 50 perform different operations by stages. (As the stage becomes higher, additional data analysis is performed, and thus more reliable decision support information may be derived.) However, the operations of the virtual world implementation unit 10 and the on-site data pre-processing unit 20 are always performed regardless of the above described stages of the digital twin system according to the present invention.

First, the stepwise data analysis unit 30 includes a threshold comparison module 310 of the first stage, a relationship analysis module 320 of the second stage, and a causality analysis module 330 (for modelling and simulation) of the third stage. In addition, the stepwise decision support information derivation unit 40 includes a static decision support information derivation module 410 of the first stage, a relationship-based decision support information derivation module 420 of the second stage, and a simulation-based decision support information derivation module 430 of the third stage. In addition, the stepwise digital twin model generation unit 50 includes a controlling digital twin model generation module 510 of the first stage, a relationship digital twin model generation module 520 of the second stage, and a simulation-based digital twin model generation module 530 of the third stage.

Here, as described above, the application service 60 corresponds to a scalable digital twin service according to the present invention.

Stepwise operations of each module will be described.

First, in the first stage of the stepwise data analysis unit 30, the threshold comparison module 310 compares data pre-processed by the data pre-processing unit 20 with a preset threshold.

In a particular embodiment, when data collected from the temperature sensor installed in an underground utility cavity or tunnel exceeds a threshold, an operation procedure, such as displaying an alarm on a control screen of the scalable digital twin service 60 and requesting the relevant person to patrol the field site in the underground utility cavity or tunnel in which the sensor is located, is provided. Here, the threshold may be set to be different for each sensor installed in the site, and may be set to one or more values for each sensor. In other words, an event situation may be divided into several levels and thresholds corresponding thereto may be set to provide the relevant person with decision support information suitable for each level.

When the data exceeds the threshold, the threshold comparison module 310 transfers the data to the scalable digital twin service 60, to the relationship analysis module 320 of the second stage, and to the static decision support information derivation module 410 which is the first stage of the stepwise decision support information derivation unit 40.

In this case, upon the data not exceeding the threshold, when a preset threshold time has passed (315) (that is, after a predetermined time interval) as shown in FIG. 3, the corresponding data is transferred to the scalable digital twin service 60, the relationship analysis module 320, and the static decision support information derivation module 410 for the data to be subject to subsequent processing. That is, the second stage of the stepwise data analysis unit 30 and the stepwise decision support information derivation unit 40 operate only when the data exceeds the threshold value in the threshold comparison module 310.

The static decision support information derivation module 410, which is the first stage processing module in the stepwise decision support information derivation unit 40, derives static decision support information from the received data and provides the derived static decision support information to the scalable digital twin service 60. The relevant person may make a decision from the static decision support information. Meanwhile, the static decision support information derived as described above is also transferred to the relationship-based decision support information derivation module 420 of the second stage.

Here, the static decision support information refers to information related to a standard operating procedure (SOP) established according to the site condition, and is a concept corresponding to dynamic information, such as various inspection reports generated by the field patrols.

On the other hand, the static decision support information derived from the static decision support information derivation module 410 may also be transferred to the controlling digital twin model generation module 510, which is the first stage of the stepwise digital twin model generation unit 50, and may be generated as a controlling digital twin model.

The generated controlling digital twin model presents on the control screen the data collected from sensors, management data (information about various pieces of equipment, such as sensors installed in the site, such as an underground utility cavity or tunnel), and spatial data. The controlling digital twin model has a data structure as shown in FIG. 4.

Meanwhile, as described above, the second and third stages of the stepwise data analysis unit 30 operate only when the data exceeds the threshold in the threshold comparison module 310 of the first stage.

The relationship analysis module 320, which is the second stage of the stepwise data analysis unit 30, analyzes a relationship of data by using pre-processed sensor data received from the data pre-processing module 210 and a result of analysis of the threshold comparison performed by the threshold comparison module 310 of the first stage, and transfers a result of the analysis of the relationship of data to the scalable digital twin service 60 as well as to the relationship-based decision support information derivation module 420, which is the second stage of the stepwise decision support information derivation unit 40.

Here, the relationship analysis refers to data analysis in consideration of the relationship between sensors, unlike independent data analysis for each sensor in the first stage. For example, when data of the temperature sensor exceeds a threshold in the first stage, relationship-based decision support information is derived considering the possibility of a fire. Even when the data of the temperature sensor exceeds the threshold, the temperature may be temporarily high due to a temporary change in situation or a malfunction of the sensor, so it is difficult to determine a fire with only the temperature data. Therefore, when deriving decision support information in the second stage, even if the temperature exceeds a threshold, unless the data detected on flame, smoke, or thermal image related to a fire exceeds a threshold, the risk of a fire is determined to be low. Whereas, if the temperature data exceeds a threshold and also the flame, smoke, or thermal image data also exceeds a threshold, it is determined that the risk of a fire is high, and decision support information appropriate to the situation is derived. As described above, in the second stage, relationship-based decision support information is derived based on a complementary relationship between different types of sensor data, and thus accuracy may be increased compared to the first stage in which data of each sensor is independently analyzed.

The decision support information derived from the relationship-based decision support information derivation module 420 is transferred to the scalable digital twin service 60 and the relationship digital twin model generation module 520, which is the second stage processing module in the stepwise digital twin model generation unit 50.

A relationship digital twin model generated by the relationship digital twin model generation module 520 analyzes the sensor data and provides support information about how the persons concerned should act (i.e., decision making) when it is determined that the possibility of a disaster is high. Therefore, the relationship digital twin model may be generated by adding dynamic data to the controlling digital twin model of the first stage (see FIG. 4). Here, the dynamic data refers to dynamic information, such as various types of inspection reports generated by field patrols and the like, as described above. FIG. 5 illustrates a data structure of the relationship digital twin model.

The stepwise digital twin model generation unit 50 may add the relationship digital twin model generated in the second stage to the controlling digital twin model generated in the first stage to generate a new digital twin model, or may update the controlling digital twin generated in the first stage.

Next, in the third stage, the causality analysis module 330 of the data analysis unit 30 analyzes data causality by using pre-processed sensor data received from the data pre-processing module 210 and the result of the relationship analysis of the second stage, so that simulation-based decision support information is derived and a simulation digital twin model is generated. That is, the result of analyzing data causality is transferred to the simulation-based decision support information derivation module 430, which is the third stage module of the stepwise decision support information derivation unit 40 such that the simulation-based digital twin model generation module 530 of the stepwise digital twin model generation unit 50 generates a simulation digital twin model. In addition, similar to the other stages, the result of the causality analysis module 330 is also directly transferred to the scalable digital twin service 60.

As described above, in the third stage, with reference to pre-processed data and the result of the second stage, the result of causality analysis (including modeling and simulation) is analyzed in addition to the result of relationship analysis of the relationship analysis module 320 of the second stage and analyzed.

The causality analysis here refers to modeling and simulation of the spread of an event, and when a disaster (an event) occurs, predicts, by using the type of disaster, the shape of the space, and sensor data, how the disaster will spread. Therefore, in the third stage, the causality analysis module 330 analyzes a method in which a generated event spreads, and the simulation-based decision support information derivation module 430 derives simulation-based decision support information from a result of the analysis and transfers the derived simulation-based decision support information to the scalable digital twin service 60 to support the decision-making of the relevant person. In addition, the simulation-based decision support information is transferred to the simulation-based digital twin model generation module 530 such that a simulation-based digital twin model is generated.

Since the simulation-based digital twin model is generated from the simulation-based decision-making support information derived by using the modeling and simulation result, the simulation-based digital twin model has a configuration in which modeling and simulation data is added to the relationship-based digital twin model of the second stage. FIG. 6 illustrates a data structure of the simulation-based digital twin model.

Figure 7:
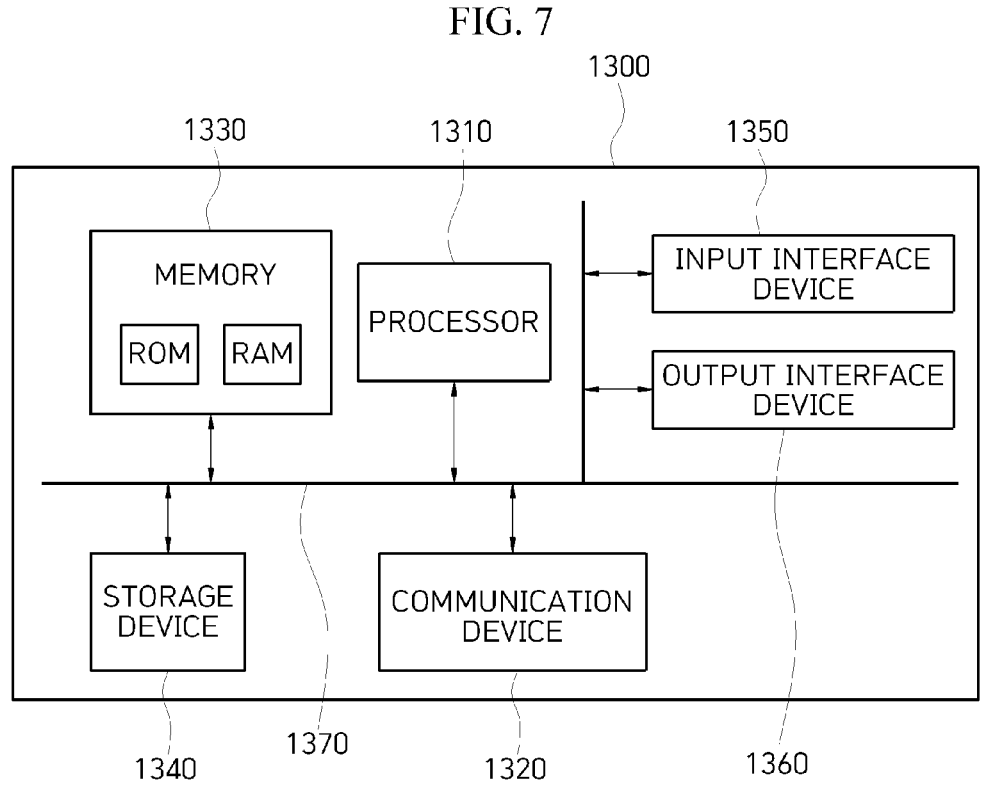
FIG. 7 is a block diagram illustrating a computer system using which the present invention is implementable.

FIG. 7 is a block diagram illustrating a computer system using which the present invention is implementable.

A computer system 1300 shown in FIG. 7 may include at least one of a processor 1310, a memory 1330, an input interface device 1350, an output interface device 1360, and a storage device 1340 that are communicated through a bus 1370. The computer system 1300 may further include a communication device 1320 coupled to a network. The processor 1310 may be a central processing unit (CPU) or a semiconductor device for executing instructions stored in the memory 1330 and/or storage device 1340. The communication device 1320 may transmit or receive a wired signal or a wireless signal. The memory 1330 and the storage device 1340 may include various forms of volatile or nonvolatile media. For example, the memory 1330 may include a read only memory (ROM) or a random-access memory (RAM). The memory 1330 may be located inside or outside the processor 1310 and may be connected to the processor 1310 through various known means. The memory 1330 may include various forms of volatile or nonvolatile media, for example, may include a ROM or a RAM.

Accordingly, the present invention may be embodied as a method implemented by a computer or non-transitory computer readable media in which computer executable instructions are stored. According to an embodiment, when executed by a processor, computer readable instructions may perform a method according to at least one aspect of the present disclosure.

In addition, the method according to the present invention may be implemented in the form of program instructions executable by various computer devices and may be recorded in computer readable media. The computer readable media may be provided with program instructions, data files, data structures, and the like alone or as a combination thereof. The program instructions stored in the computer readable media may be specially designed and constructed for the purposes of the present invention or may be well-known and available to those having skill in the art of computer software. The computer readable storage media include hardware devices configured to store and execute program instructions. For example, the computer readable storage media include magnetic media such as hard disks, floppy disks, and magnetic tape, optical media such as a compact disc (CD)-ROM and a digital video disk (DVD), magneto-optical media such as floptical disks, a ROM, a RAM, a flash memory, etc. The program instructions include not only machine language code made by a compiler but also high level code that can be used by an interpreter etc., which is executed by a computer.

From the foregoing, according to the present invention, analysis of data collected in the real world, derivation of decision support information, and generation of a digital twin model are performed in three stages according to complexity. As described above, the operations of the digital twin are divided into several stages according to complexity and the results of each stage are transferred to the application service, i.e., scalable digital twin service, and the next stage, so that as the stage becomes higher, a more reliable result can be acquired.

The present invention is implemented to, when an event (e.g., a disaster in the field of disaster safety, or a sign etc. of a disaster that appears before occurrence of a disaster) occurs in the real world, provide simple information preferentially for the relevant person to take an appropriate response immediately and then provide accurate decision support information through various analyses by timeline, thereby contributing to reducing the damage caused by the spread of an event in various fields.

While embodiments of the present invention have been described in detail, it should be understood that the technical scope of the present invention is not limited to the embodiments and drawings described above, and is determined by a rational interpretation of the scope of the claims.

What is claimed is:

1. A scalable digital twin service system, which is a digital twin service for providing decision support information to an application service based on a digital twin, the scalable digital twin service system comprising:
    a processor; a memory storing instructions that, when executed by the processor, cause the processor to implement:
    a virtual world implementation unit configured to implement a virtual world using spatial information and sensor data acquired from a real world;
    a stepwise data analysis unit configured to analyze data acquired from the implemented virtual world; and
    a stepwise decision support information derivation unit configured to derive decision support information from the data analyzed by the stepwise data analysis unit, wherein the virtual world and the data acquired from the virtual world are transferred to the application service and the stepwise data analysis unit,
    a result of the analysis in the stepwise data analysis unit is transferred to the application service and the stepwise decision support information derivation unit, and
    the decision support information derived from the stepwise decision support information derivation unit is transferred to the application service.

2. The scalable digital twin service system of claim 1, wherein the memory further stores instructions that, when executed by the processor, cause the processor to implement a data pre-processing unit configured to pre-process data acquired from the virtual world implementation unit.

3. The scalable digital twin service system of claim 1, wherein each of the stepwise data analysis unit and the stepwise decision support information derivation unit is configured to perform:
    first stage real-time controlling;
    second stage relationship analysis on sensor data; and
    third stage causality analysis, including data analysis for modeling and simulation, on spread of an event.

4. The scalable digital twin service system of claim 1, wherein the stepwise data analysis unit includes a threshold comparison module of a first stage, a relationship analysis module of a second stage, and a causality analysis module of a third stage,
    wherein the threshold comparison module is configured to compare data acquired from the virtual world implementation unit with a preset threshold, and when the data exceeds the preset threshold, transfer the data to the application service, the relationship analysis module, and the stepwise decision support information derivation unit,
    the relationship analysis module is configured to analyze a relationship of data using data received from the virtual world implementation unit and a result of analysis of the threshold comparison performed by the threshold comparison module, and transfer a result of the analysis of the relationship of data to the application service and the stepwise decision support information derivation unit, and
    the causality analysis module is configured to analyze a result of causality analysis in addition to a result of the relationship analysis of the relationship analysis module, and transfer a result of the analysis to the application service and the stepwise decision support information derivation unit.

5. The scalable digital twin service system of claim 1, wherein the stepwise decision support information derivation unit includes a static decision support information derivation module of a first stage, a relationship-based decision support information derivation module of a second stage, and a simulation-based decision support information derivation module of a third stage,
    wherein the static decision support information derivation module is configured to derive static decision support information from received data and transfer the static decision support information to the application service and the relationship-based decision support information derivation module,
    the relationship-based decision support information derivation module is configured to analyze a data relationship received from the stepwise data analysis unit and analyze the static decision support information received from the static decision support information derivation module to derive relationship-based decision support information, and transfer the derived relationship-based decision support information to the application service and the simulation-based decision support information derivation module, and the simulation-based decision support information derivation module is configured to analyze data causality received from the stepwise data analysis unit and analyze the relationship-based decision support information received from the relationship-based decision support information derivation module to derive simulation-based decision support information, and transfer the simulation-based decision support information to the application service.

6. The scalable digital twin service system of claim 1, wherein the memory further stores instructions that, when executed by the processor, cause the processor to implement a stepwise digital twin model generation unit configured to generate a digital twin model using the decision support information derived from the stepwise decision support information derivation unit and transfer the digital twin model to the application service.

7. The scalable digital twin service system of claim 6, wherein the stepwise digital twin model generation unit includes a controlling digital twin model generation module of a first stage, a relationship digital twin model generation module of a second stage, and a simulation digital twin model generation module of a third stage, wherein the controlling digital twin model generation module is configured to generate a controlling digital twin model using static decision support information received from the stepwise decision support information derivation unit and transfer the controlling digital twin model to the application service, the relationship digital twin model generation module is configured to generate a relationship digital twin model using relationship-based decision support information received from the stepwise decision support information derivation unit and transfer the relationship digital twin model to the application service, and the simulation digital twin model generation module is configured to generate a simulation digital twin model using simulation-based decision support information received from the stepwise decision support information derivation unit and transfer the simulation digital twin model to the application service.

8. The scalable digital twin service system of claim 7, wherein the controlling digital twin model includes sensor data, spatial data, and management data.

9. The scalable digital twin service system of claim 7, wherein the relationship digital twin model includes sensor data, spatial data, management data, and dynamic data.

10. The scalable digital twin service system of claim 7, wherein the simulation digital twin model includes sensor data, spatial data, management data, dynamic data, and simulation data.

11. A scalable digital twin service method, which is a digital twin service method for providing decision support information to an application service based on a digital twin, the scalable digital twin service method comprising:

a virtual world implementation operation of integrating spatial information and sensor data acquired from the real world to implement a virtual world;

a data analysis operation of analyzing data acquired from the implemented virtual world; and a decision support information derivation operation of deriving decision support information from the data analyzed by the data analysis operation, wherein the data analysis operation includes a threshold comparison sub-operation corresponding to a first stage, a sensor data relationship analysis sub-operation corresponding to a second stage, and a causality analysis sub-operation corresponding to a third stage that performs a causality analysis, including data analysis for modeling and simulation, on event spread, and the decision support information derivation operation includes a static decision support information derivation sub-operation corresponding to a first stage, a relationship-based decision support information derivation sub-operation corresponding to a second stage, and a simulation-based decision support information derivation sub-operation corresponding to a third stage.

12. The scalable digital twin service method of claim 11, wherein, in the data analysis operation, the threshold comparison sub-operation includes comparing data acquired from the virtual world implementation operation with a preset threshold, and when the data exceeds the preset threshold, transferring the data to the application service, the relationship analysis sub-operation, and the decision support information derivation operation, the relationship analysis sub-operation includes analyzing a relationship of data using data received from the virtual world implementation operation and a result of analysis of the threshold comparison performed by the threshold comparison sub-operation, and transferring a result of the analysis of the relationship of data to the application service and the decision support information derivation operation, and the causality analysis sub-operation includes analyzing a result of causality analysis, including data analysis for modeling and simulation, in addition to a result of the relationship analysis of the relationship analysis sub-operation, and transferring a result of the analysis to the application service and the decision support information derivation operation.

13. The scalable digital twin service method of claim 11, wherein, in the decision support information derivation operation, the static decision support information derivation sub-operation includes deriving static decision support information from received data and transferring the static decision support information to the application service and the relationship-based decision support information derivation sub-operation, the relationship-based decision support information derivation sub-operation includes analyzing a data relationship received from the data analysis operation and analyzing the static decision support information received from the static decision support information derivation sub-operation to derive relationship-based decision support information, and transferring the derived relationship-based decision support information to the application service and the simulation-based decision support information derivation sub-operation, and the simulation-based decision support information derivation sub-operation includes analyzing data causality received from the data analysis operation and analyzing the relationship-based decision support information received from the relationship-based decision support information derivation sub-operation to derive simulation-based decision support information and transferring the simulation-based decision support information to the application service.

14. The scalable digital twin service method of claim 11, further comprising a digital twin model generation operation of generating a digital twin model using the decision support information derived from the decision support information derivation operation and transferring the digital twin model to the application service.

15. The scalable digital twin service method of claim 14, wherein the digital twin model generation operation includes a controlling digital twin model generation sub-operation corresponding to a first stage, a relationship digital twin model generation sub-operation corresponding to a second stage, and a simulation digital twin model generation sub-operation corresponding to a third stage, wherein the controlling digital twin model generation sub-operation includes generating a controlling digital twin model using static decision support information received from the decision support information derivation operation and transferring the controlling digital twin model to the application service, the relationship digital twin model generation sub-operation includes generating a relationship digital twin model using relationship-based decision support information received from the decision support information derivation operation and transferring the relationship digital twin model to the application service, and the simulation digital twin model generation sub-operation includes generating a simulation digital twin model using simulation-based decision support information received from the decision support information derivation operation and transferring the simulation digital twin model to the application service.

16. The scalable digital twin service method of claim 15, wherein the controlling digital twin model includes sensor data, spatial data, and management data.

17. The scalable digital twin service method of claim 15, wherein the relationship digital twin model includes sensor data, spatial data, management data, and dynamic data.

18. The scalable digital twin service method of claim 15, wherein the simulation digital twin model includes sensor data, spatial data, management data, dynamic data, and simulation data.

19. The scalable digital twin service method of claim 11, further comprising a data pre-processing operation of pre-processing data collected from the virtual world implementation operation.

* * * * *